United States Patent
Kapoor et al.

(10) Patent No.: US 6,748,393 B1
(45) Date of Patent: Jun. 8, 2004

(54) TRANSPARENT UPDATES TO PARTITIONED VIEWS IN A FEDERATED DATABASE SYSTEM

(75) Inventors: Rahul Kapoor, Bellevue, WA (US); Nigel R. Ellis, Redmond, WA (US); Cesar A. Galindo-Legaria, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 475 days.

(21) Appl. No.: 09/839,806

(22) Filed: Apr. 20, 2001

(51) Int. Cl.[7] .................................. G06F 17/30
(52) U.S. Cl. .................................. 707/102; 707/3
(58) Field of Search .................... 707/2, 3, 102, 707/104.1, 10

(56) References Cited

U.S. PATENT DOCUMENTS

| | | | | |
|---|---|---|---|---|
| 6,125,360 A | * | 9/2000 | Witkowski et al. | 707/2 |
| 6,223,171 B1 | * | 4/2001 | Chaudhuri et al. | 707/2 |
| 6,339,769 B1 | * | 1/2002 | Cochrane et al. | 707/2 |
| 6,389,410 B1 | * | 5/2002 | Gupta | 707/2 |
| 6,535,872 B1 | * | 3/2003 | Castelli et al. | 707/3 |

* cited by examiner

Primary Examiner—Diane D. Mizrahi
(74) Attorney, Agent, or Firm—Woodcock Washburn LLP

(57) ABSTRACT

A system and methods allowing for the transparent updates of views in database environments is provided. In operation, the partitioned view may be modified, deleted, or replaced using a portioning function. A partitioning function operates on data in the database environment to provide updates of partitioned views. The partitioning function is generated for each partitioned view. The partitioning function is generated by loading the partitioning constraint expression on the partitioning column for each child table of the partitioned view. The tables are remapped such that a view column is superimposed on the partitioning column. The resulting remapped table is stored in an array of expressions that are then processed to produce the partitioning function. The partition-id of each table in the partitioned view is set based on their order of appearance in the initial view definition. Further, the present invention contemplates partitioned column updates and non-partitioned column updates.

27 Claims, 10 Drawing Sheets

Customers — 208

| cust_name | branch | balance | ... |
|---|---|---|---|
| James | Key West | ... | ... |
| William | Oyster Bay | ... | ... |
| Paul | Liverpool | ... | ... |
| Cleo | Boston | ... | ... |
| . | . | . | . |

Figure 2

TRANSPARENT UPDATES TO PARTITIONED VIEWS IN A FEDERATED DATABASE SYSTEM

BACKGROUND OF THE INVENTION

1. Field of the Invention

The present invention relates generally to the field of database systems and, more particularly, to a system and method allowing for transparent updates of partitioned views in database environments.

2. Brief Description of Prior Developments

Database systems store, retrieve, and process information. In order to retrieve information from the database, a user provides a query (written in a query language such as SQL), where the query specifies the information to be retrieved and the manner in which it is to be manipulated or evaluated in order to provide a useful result. To process the query, the database system converts the query into a relational expression that describes algebraically the result specified by the query. The relational expression is then used to produce an execution plan, which describes particular steps to be taken by a computer in order to produce the sought result.

Database environments comprise various configurations having cooperating homogeneous and/or heterogeneous data stores. These data stores generally maintain data in tables (T) that may reside locally on a single data store or be may distributed among several data stores in a distributed database environment. Included in the category of distributed database environments are clustered databases and federated databases. A clustered database configuration contemplates several data stores closely cooperating to produce a singular view of the data stored on the data stores. Comparatively, a database federation is a group of data stores (e.g. computer servers) that are administered independently, but which cooperate to share the processing load of a system. These various database environments support a number of views that may be imposed to better manage the underlying table (T) data. For example, these database environments (e.g. stand-alone, clustered, and federated) may be partitioned such that the table or tables storing data may be more efficiently handled. In the case of distributed database environments, distributed partitioned views may be created.

Generally, a partitioned view joins horizontally partitioned data from a set of member tables across one or more data stores making the data as if it appears from one database table. In a local partitioned view, all participating tables and the view reside on the same instance of the data store (e.g. the same instance of SQL server). In a distributed partitioned view, at least one of the participating tables resides on a different (i.e. remote) data store. For partitioned tables to exist the location of single data row in a partitioned table (T) must be uniquely located. Current implementations satisfy this requirement through the use of ranges (e.g. column and/or row ranges), or, through hashing functions which operate on columns and/or rows. In the ranges-based implementation, the member tables of the partitioned view are designed so that each table stores a horizontal slice of the original table based on a range of key values. The ranges are based on the data values in a partitioning column. The partitioning column serves to contain values that facilitate the creation and maintenance of partitioned views in partitioned database environments.

The member tables of the partitioned view are designed so that each table stores a horizontal slice of the original table based on a range of key values. The ranges are based on the data values in a partitioning column. The range of values in each member table is enforced by a database environment constraint (e.g. CHECK constraint) on the partitioning column, such that ranges do not overlap.

Current practices allow for the update of database environment views such that data represented by such views can be modified, deleted, or replaced. In the context of updating partitioned views in distributed database environments, such practices lend to inefficient and non-optimal uses of processing resources. Stated differently, tables residing on a number of data stores may require numerous processing steps to satisfy offered update requests. For example, if data is to be updated on remote participating data stores of partitioned database environments, a number of unnecessary steps, such as, reading from and writing to numerous tables may be performed.

In view of the foregoing, it is appreciated that there exists a need for an improved query execution strategy that overcomes the drawbacks of existing practices.

SUMMARY OF THE INVENTION

Generally the present invention provides a system and methods that allow for the efficient transparent update of views in database environments. In an illustrative implementation, a plurality of data stores are provided such that they are arranged in a data store federation having distributed partitioned views. In operation, the partitioned view may be modified by the inserting new data, deleting existing data, and updating existing data. A partitioning function operates on data in the database environment to provide updates of partitioned views. In the contemplated implementation, the partitioning function is generated for each partitioned view. The partitioning function is generated by loading the partitioning constraint expression on the partitioning column for each child table of the partitioned view. The tables are remapped such that a view column is superimposed on the partitioning column. The resulting remapped table is stored in an array of expressions. These expressions are then processed to produce the partitioning function. The partition-id of each table in the partitioned view is set based on their order of appearance in the initial view definition. Further, the present invention contemplates partitioned column updates and non-partitioned column updates.

Further aspects of the invention are described below.

DETAILED DESCRIPTION OF THE DRAWINGS

The system and methods providing the creation and execution of scalar-based queries in database environments are further described with reference to the accompanying drawings in which:

FIG. 2 is a block diagram of an exemplary table that stores data in accordance with the present invention;

DETAILED DESCRIPTION OF ILLUSTRATIVE IMPLEMENTATIONS

Overview

Figure 1:
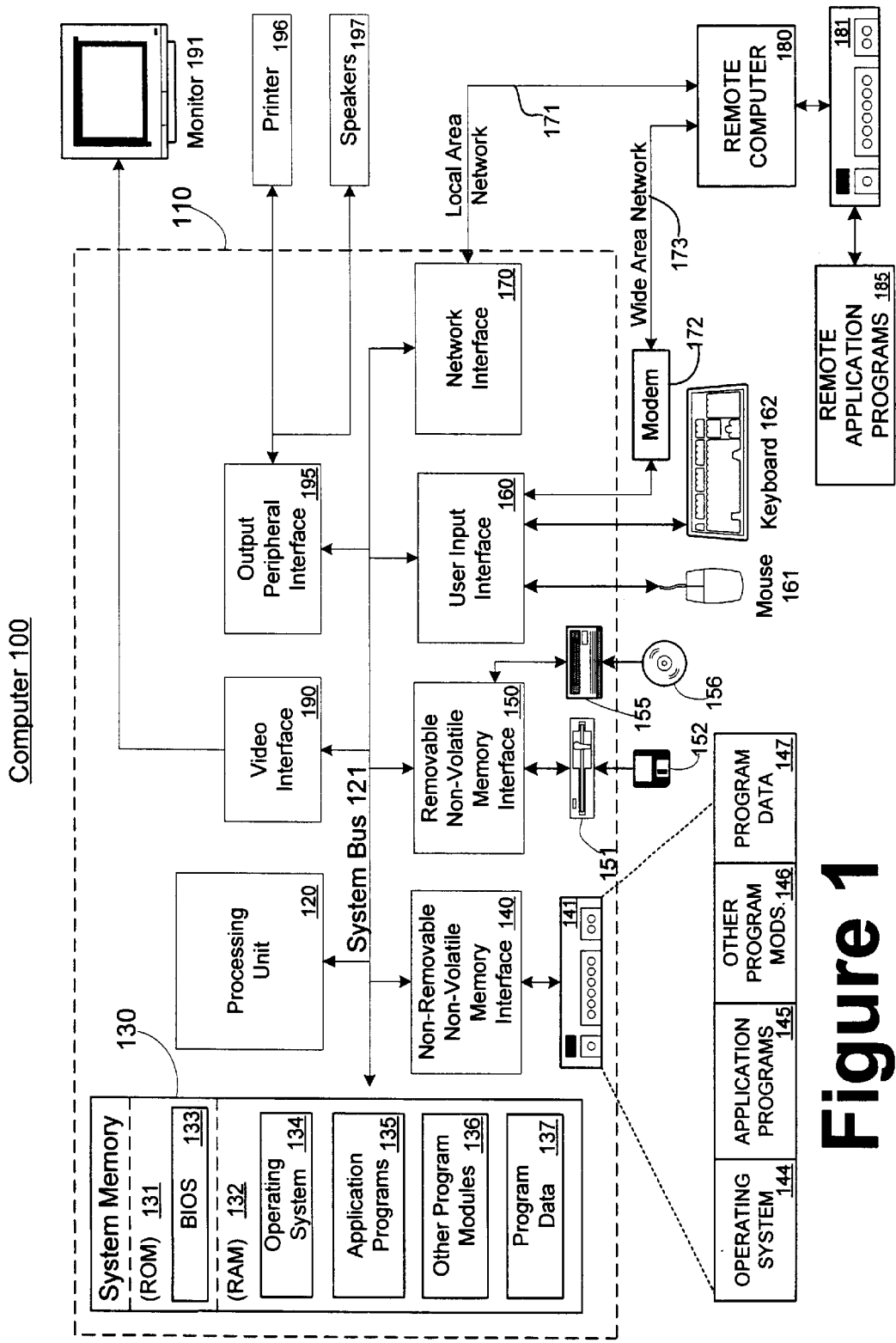
FIG. 1 is a block diagram of an exemplary computing environment in which aspects of the present invention may be incorporated.

Data store designers and operators, alike, are constantly striving to maximize processing efficiencies and to increase data store volume capacities. Recent developments in data store design allow for efficient processing, management, and storage of large volumes of data. For example, distributed database environments, such as, clustered databases and federated databases allow large volumes of data to be stored, and subsequently, processed on a plurality of cooperating data stores. With clustered databases, the data stores act in conjunction to create a seamless environment providing a singular view of the underlying data. Comparatively, federated databases comprise data stores that are more loosely coupled such that each data store operates independent from each other but can communicate information between each other.

Along with distributed database environments, other advances, such as, the development of partitioned views, and distributed partitioned views have allowed for more efficient processing and better management of data. A partitioned view joins horizontally partitioned data from a set of member tables across one or more servers, making the data appear as if from one table. In a distributed partitioned view, at least one of the partitioning tables resides on a different (remote) data store. Distributed partitioned views can be used to implement a database federation. A table must first be horizontally partitioned before implementing a partitioned view. In this instance, the original table is replaced with several smaller member tables. Each member table has the same number of columns as the original table, and each column has the same attributes (such as data type, size, collation) as the corresponding column in the original table. In the case of distributed partitioned views, each member table resides on a separate member data store. Generally, the member tables are designed such that each member table stores a horizontal slice of the original table based on a range of key values. The ranges are based on the data values in a partitioning column. The range of values in each member table is enforced by a CHECK constraint on the partitioning column, such that ranges cannot overlap. For example, a member table having a range from 1 through 200000 can not coexist with another member table having a range from 150000 through 300000 because it would not be clear which member table contains the values from 150000 to 200000.

Applying the above conditions, an exemplary table "Customer" may be partitioned into three member tables (residing on three cooperating data stores) using the CHECK constraint with the following pseudo-code:

```
--On Data Store 1:
    CREATE TABLE Customer_33
        (CustomerID INTEGER PRIMARY KEY NOT NULL
            CHECK (CustomerID BETWEEN 1 AND 32999),
        . . . --Additional Column Definitions)
```

```
--On Data Store 2:
    CREATE TABLE Customer_66
        (CustomerID INTEGER PRIMARY KEY NOT NULL
            CHECK (CustomerID BETWEEN 33000 AND
                65999),
        . . . --Additional Column Definitions)
```

```
--On Data Store 3:
    CREATE TABLE Customer_99
        (CustomerID INTEGER PRIMARY KEY NOT NULL
            CHECK (CustomerID BETWEEN 66000 AND
                99999),
        . . . --Additional Column Definitions)
```

The member tables having been created, a distributed partitioned view can be created on each member data store, with each view having the same name. This allows queries referencing the distributed partitioned view name to run on any of the member data stores. In operation, the system behaves as if a copy of the original table is on each member data store, where in reality each data store has only a member table and a distributed partitioned view.

A distributed partitioned view can be built by adding linked data store definitions on each member data store containing the connection information needed to execute distributed queries on the other member data stores. This gives a distributed partitioned view access to data on the other cooperating data stores. In addition, a distributed partitioned view should be created on each member data store. The views use distributed SELECT statements to access data from the linked member data stores, and merges the distributed rows with rows from local member tables. For the exemplary table provided, a distributed partitioned view may be created by adding a linked-data store definition named DataStore2 with the connection information for DataStore2 and linked-data store definition named DataStore3 for access to DataStore3 on Data Store 1 (the same step is repeated for Data Stores 2 and 3). Further, distributed partitioned views are created for Data Stores 1, 2, and 3, using the following pseudo-code:

```
CREATE VIEW Customer AS
    SELECT           *              FROM
        CompanyDatabase.TableOwner.Customers_33
    UNION ALL
    SELECT      *      FROM      DataStore2.
        CompanyDatabase.TableOwner.Customers_66
    UNION ALL
    SELECT      *      FROM      DataStore3.
        CompanyDatabse.TableOwner.Customers_99
```

Once the distributed partitioned views are created, the views may be updated to modify, delete, and/or replace, and display desired data. These queries are part of execution plans that are performed in various database environments.

Conventional practices necessitated tight coupling of cooperating data stores when performing updates to views in distributed database environments. That is, database environments had to be of the type where full-shared-nothing operations occur, or alternatively, considered part of a clustered database environments. Such database environments provide a "single system image" view of the database from any point in the data store cluster. Such database environments generally require extensive configuration to realize the "single system image". In operation, the database environment is taxed to process this extensive configuration information leading to non-optimal use of processing resources.

The present invention aims to ameliorate the shortcomings of existing practices by providing a system and methods that allow for the transparent update of data using distributed partitioned views. In an illustrative implementation, updateable partitioned views are provided to transparently partition data across a group of cooperating data stores. Although these data stores cooperate in managing the partitioned data, they operate autonomously. That is each data store is managed independently, has separate operational rules, and can support independent processes and data. This configuration is known as a federation, that is a group of autonomous data stores that cooperate to process a workload. By providing a system and method to perform updates on federated databases, the present invention removes the above-described restrictions requiring specific database configurations.

As is described below with respect to FIGS. 1–4D, the present invention is directed to a system and methods allowing transparent updates of views in database environments. In accordance with an illustrative implementation, the present invention performs such updates in distributed database environments that have distributed partitioned views.

Exemplary Computing Environment

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Database Environment

Modern database systems, particularly those based on the relational model, store data in the form of tables. A table is a collection of data organized into rows and columns. FIG. 2 shows an exemplary table 200. In this example, table 200 is a list of bank customers, showing each customer's branch and balance. Table 200 has rows 202 and columns 204. Each column 204 has a name 206. Table 200 may also have a name 208. In the example of FIG. 2, table 200 has the name 208 "Customers." Table 200 has three columns 204. The names 206 of columns 204 are "cust_name," "branch," and "balance," respectively. The first row 202 of table 200 contains the data "James," "Key West," and "$1000." In the terminology of database systems, table 200 is sometimes referred to as a "relation," each row 202 as a "tuple," and the name 206 of each column as an "attribute." It will be appreciated that the depiction of table 200 in FIG. 2 is merely exemplary. A table may have any number of rows and columns, and may store any type of data, without departing from the spirit and scope of the invention.

Figure 2A:
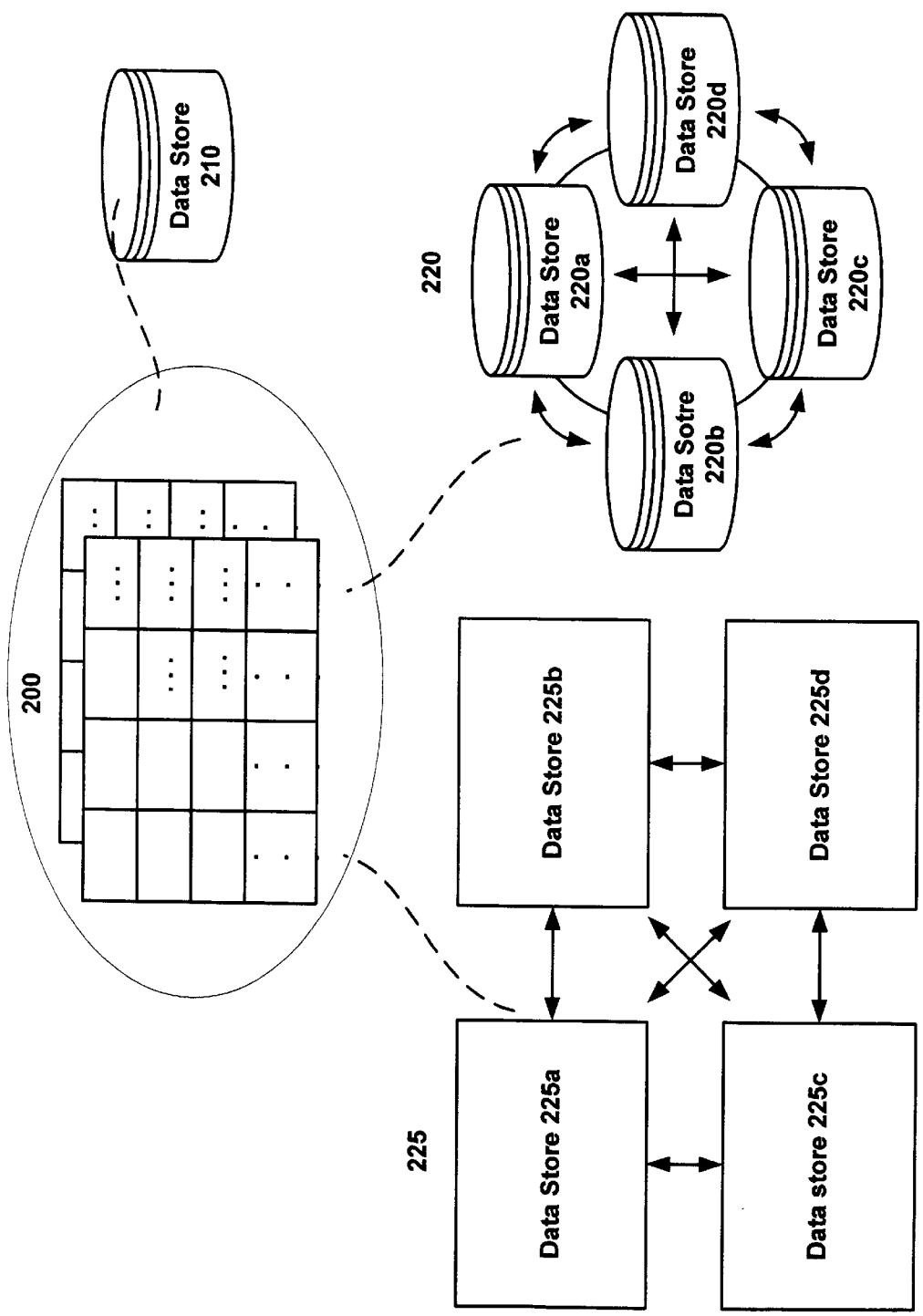
FIG. 2A is a block diagram of exemplary distributed database environments in accordance with the present invention.
Figure 3:
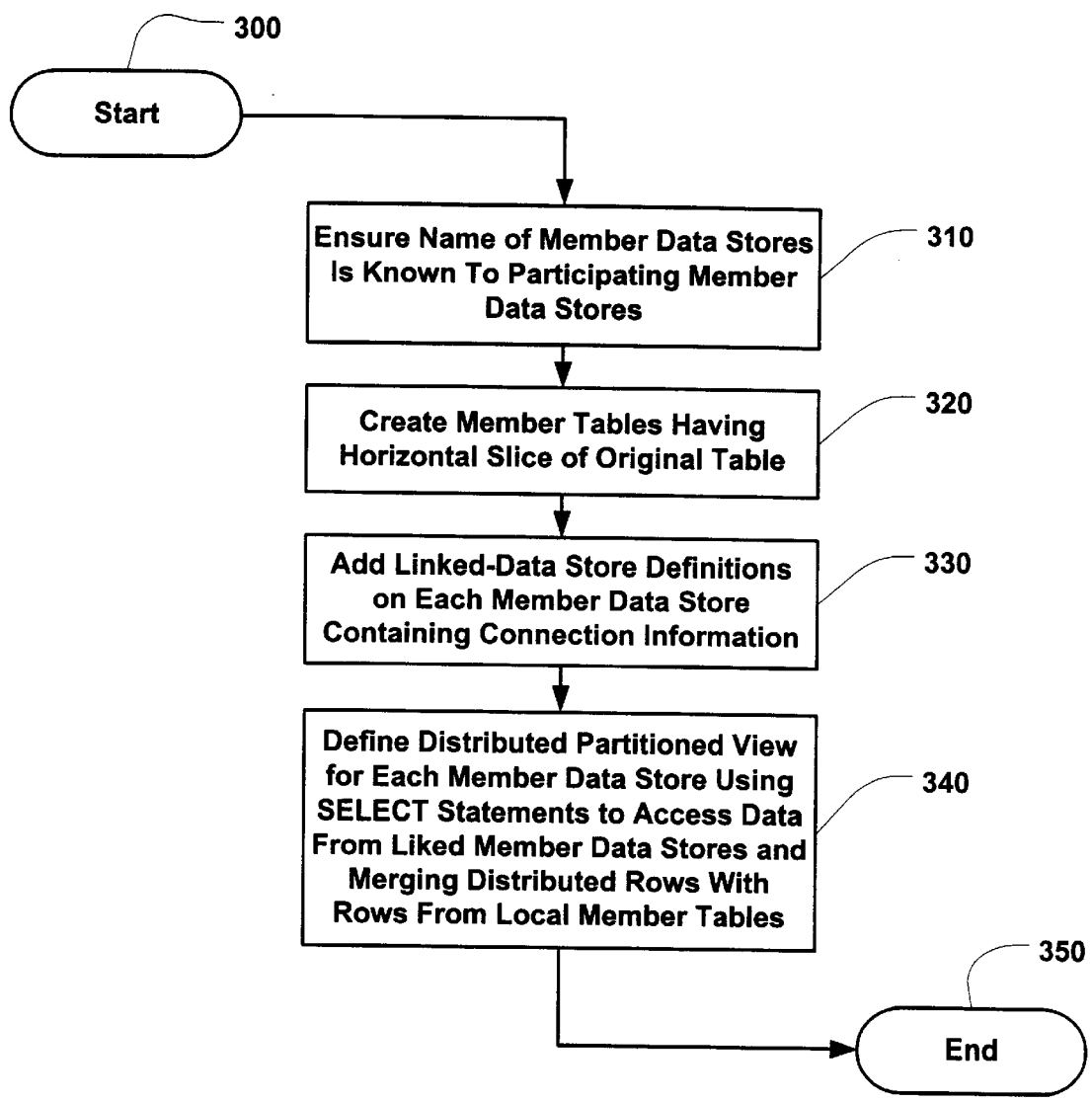
FIG. 3 is a flow diagram of the processing performed to create an exemplary federated database environment having distributed partitioned views in accordance with the present invention.

As shown in FIG. 2A, exemplary table 200 may reside on a single data store 210 or, alternatively, may be distributed over a number of interconnected data stores, such as, data stores 220 and 225. The interconnected data stores may be interconnected such that data store cluster 220 (having data stores 220a, 220b, 220c, and 220d) is formed. Generally, a cluster is a group of independent systems working together as a single system. A client interacts with a cluster as though the cluster is a single server, even though many servers may be clustered together. The cluster also provides a single management entity. Cluster configurations are used to provide higher availability, easier manageability and wider scalability. Alternatively, the data stores may be arranged such that a federation of data stores 225 is created. Clustered data stores generally are "tightly" connected requiring extensive sharing of configuration information and table properties. Comparatively, with data store federation, the relationship is such that the data stores are more loosely coupled. Stated differently, the data stores of a federation are independent, but one data store can call on other data stores to supply information.

As shown in FIG. 2A, data store federation 225 comprises a number of data stores 225a, 225b, 225c, and 225d. These data stores act independently from each other but are coupled such that data may be shared between themselves. In an illustrative implementation, database federation 225 may house data tables capable of having partitioned views. A partitioned view joins horizontally partitioned data from a set of member tables across one or more data stores (or data servers), making the data appear as if from one table. A distinction can be made between a local and distributed partitioned view. In a local partitioned view, all participating tables and the view reside on the same instance of a data store management application (e.g. Microsoft® SQL Server™ 2000). In a distributed portioned view, at least one of the participating tables resides on a different (remote) server. Generally, distributed partitioned views can be used to implement a federation of database servers.

Partitioned Views:

Partitioned views generally allow data that is stored in large tables to be split into smaller member tables. In an exemplary operation, the data is partitioned between member tables based on ranges of data values in one of the columns. The data ranges for each member table are defined in a CHECK constraint specified on the partitioning column. A view that uses UNION ALL to combine selects of all the member tables into a single result set is then defined. When SELECT statements referencing the view specify a search condition on the partition column, the query processor of the data store uses the CHECK constraint definitions to determine which member table contains the rows.

For example, a sales table that records sales for 1998 can be partitioned into 12 member tables, one for each month. Each member table has a constraint defined in the OrderMonth column as described by the following pseudo-code:

```
CREATE TABLE May1998Sales
    (OrderID           INT    PRIMARY KEY,
    CustomerID         INT              NOT NULL,
    OrderDate          DATETIME         NOT NULL
        CHECK (DATEPART(yy, OrderDate) = 1998),
    OrderMonth         INT
        CHECK (OrderMonth = 5),
    DeliveryDate       DATETIME         NULL,
    )
```

In the example provided, the application populating May1998Sales must ensure all rows have 5 in the OrderMonth column and the order date specifies a date in May, 1998. This is enforced by the constraints defined in the table. A view can then be defined that uses UNION ALL to select the data from all 12 member tables as a single result set:

CREATE VIEW Year1998Sales
AS
SELECT * FROM Jan1998Sales
UNION ALL
SELECT * FROM Feb1998Sales
UNION ALL
. . .
SELECT * FROM Dec1998Sales
UNION ALL Accordingly, the SELECT statement performed on the new view Year1998Sales SELECT *
FROM Year1998Sales
WHERE OrderMonth In (5,6) AND CustomerID=64892
  results in a search in the May1998Sales and Jun1998Sales tables (i.e. the $5^{th}$ and $6^{th}$ member table), and limits its search to those tables.

Generally, CHECK constraints are not needed for the partitioned view to return the correct results. However, if the CHECK constraints have not been defined, the query processor of the data stores must search all cooperating tables instead of only those that cover the search condition on the partitioning column. Without the CHECK constraints, the view operates like any other view with UNION ALL. The query processor on cooperating data stores will generally not make any assumptions about the values stored in different tables and it will generally not skip searching the tables that participate in the view definition. If all the member tables referenced by a partitioned view are on the same data store, the view is a local partitioned view. If the member tables are on multiple data stores, the view is a distributed partitioned view. When processing queries on distributed partitioned views an important variable that affects overall processing efficiency is the amount of data that is being transferred between cooperating data stores.

Transparent Updates of Views:

Some database environments, such as Microsoft's® SQL Server 2000™ build dynamic execution plans to make efficient use of distributed queries to access data from remote member tables (i.e. member tables residing on remote data stores resulting from the application of a distributed partitioned view on a particular table or tables). These dynamic plans may be created by first retrieving the CHECK constraint definitions from each member table (this allows the query processor to map the distribution key values across the member tables). The query processor then compares the key ranges specified in an SQL state WHERE clause to develop a map showing how the rows are distributed in the member tables. The query processor then builds a query execution plan that uses distributed queries to retrieve only those remote rows needed to complete the SQL statement. The execution plan may also be built in such a way that any access to remote member table, for either data or meta data, are delayed until the information is required.

For example, a system may have a Customers table that is partitioned across DataStore1 (CustomerID from 1 through 32999), DataStore2 (CustomerID from 33000 to 65999), and DataStore3 (CustomerID from 66000–99999). The following query SELECT *
FROM CompanyData.dbo.Customers
WHERE CustomerID BETWEEN 32000 and 34000 may be processed by the system by employing an execution plan that extracts rows with CustomerID key values from 32000 through 32999 from the local member table, and issues a distributed query to retrieve the rows with key values from 33000 through 34000 from DataStore2. In the case where a query is to be processed repetitively requiring extensive processing resources, the query may be parameterized such that the processing for the query is efficiently distributed among cooperating data stores. Parameterized queries are queries written for reusability. They contain parameter markers as placeholders for data that will change from execution to execution. In operation, a parameterized query may be realized as Standard Query Language (SQL) queries that require one or more parameters or arguments before execution. For example, an SQL statement that refers to a specific part number as supplied by the user would use a parameterized query to insert the user-provided number into the SQL statement before execution so that the query references that specific part.

The notion of transparent updates is better described by the following example.

For example, a Customer table is partitioned into three tables:

On Data Store1:
CREATE TABLE Customer_33
(CustomerID INTEGER NOT NULL PRIMARY KEY
    CHECK (CustomerID BETWEEN 1 and 32999),
    . . .—Additional Column Definitions)
On Data Store2:
CREATE TABLE Customer_66
(CustomerID INTEGER NOT NULL PRIMARY KEY
    CHECK (CustomerID BETWEEN 33000 and 65999),
    . . .—Additional Column Definitions)
On Data Store3:

CREATE TABLE Customer_99
(CustomerID INTEGER NOT NULL PRIMARY KEY
CHECK (CustomerID BETWEEN 66000 and 99999),
. . .—Additional Column Definitions)
The following distributed partitioned view can be created for this exemplary table:
CREATE VIEW Customers AS
SELECT * FROM DataStore1.CompanyDatabase.TableOener.Customers_33
UNION ALL
SELECT * FROM DataStore2.CompanyDatabase.TableOwner.Customers_66
UNION ALL
SELECT * FROM DataStore3.CompanyDatabase.TableOwner.Customers_99

A view is generally considered an updateable partitioned view if the following conditions are met:

The view is a set of SELECT statements whose individual result sets are combined into one using the UNION ALL statement Each individual SELECT statement references a single SQL Server table The table can either be a local table or a remote table residing on a linked server that is referenced.

Partitioned views generally maintain partitioning columns that are used to define the partitioned view. Partitioning columns adhere to specific rules to realize such partitioning. These rules may vary according to a particular implementation of a distributed database environment. It is understood that although a distributed database environment having distributed partitioned views is provided to illustrate features of this invention, that such environment is merely exemplary as this invention contemplates the execution of queries in database environments having varying configurations.

Figure 4:
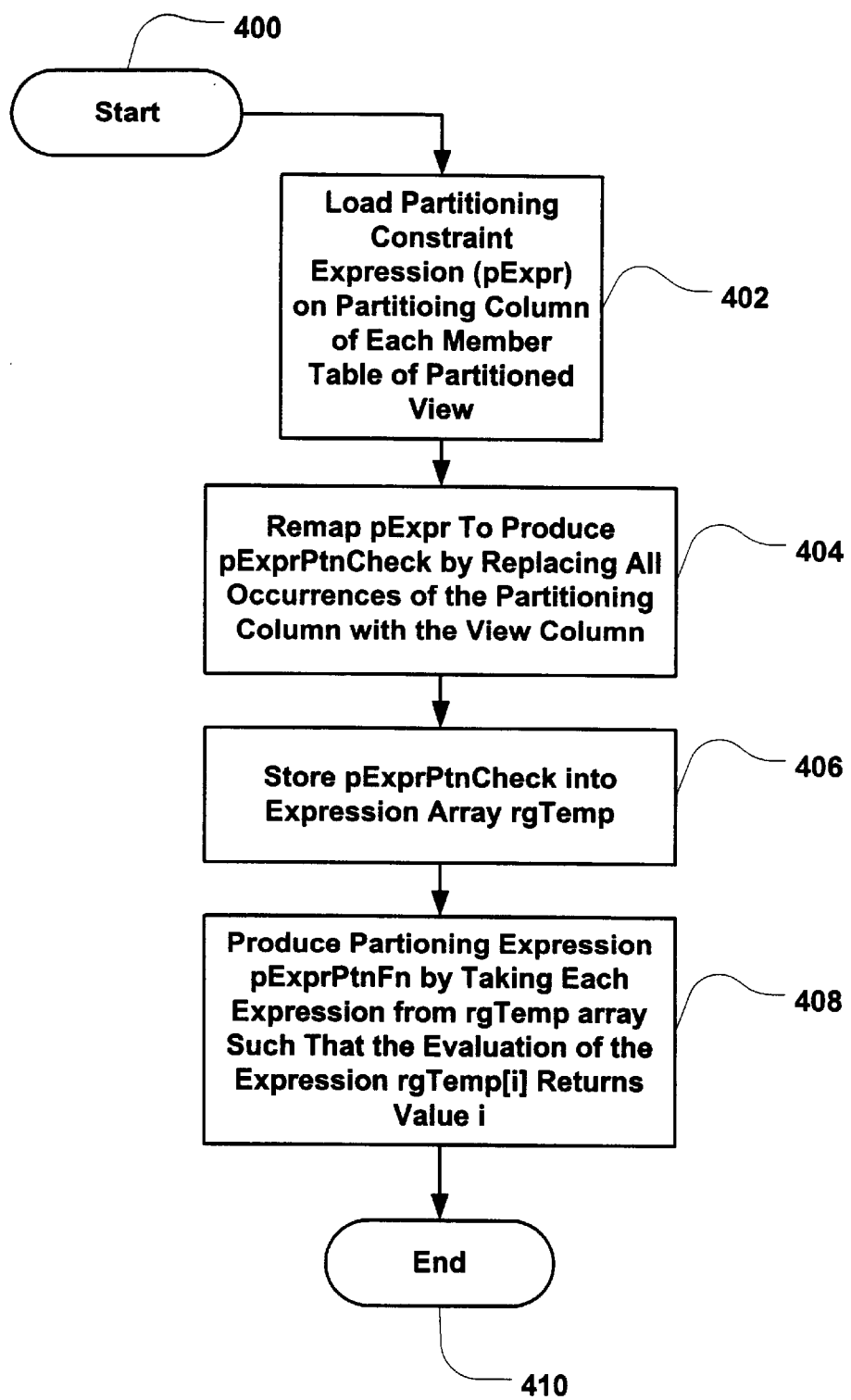
FIG. 4 is a flow diagram showing the processing performed to generate a partitioning function in accordance with the present invention.

FIG. 4 shows the processing performed to generate a partitioning function for a partitioned view V to realize transparent updates. The partitioning function may be generated by calling function GeneratePartitionFn( ) for a partitioned view V delivering columns {pc, c1, . . . }, partitioned by column pc over tables T1 delivering columns {pc,c1, . . . }, . . . Tn delivering columns {pc, c1, . . . }. The syntax of the Generate partition function (GeneratePartitionFn( )) is: GeneratePartitionFn(V as View, pViewExpr AS expression) RETURNS expression. Processing begins at block 400 and proceeds to block 402 where a partitioning constraint expression(pExpr) is loaded on the partitioning column of each member table Ti for partitioned view V. From there the partitioning constraint expression (pExpr) is remapped at block 404 to produce a new expression pExprPtnCheck, which replaces all occurrences of the partitioning column pc from table ti with the view column V.pc. The resultant expression is stored into expression array rgTemp at location rgTemp[i] at block 406. From there the partitioning expression pExprPtnFn is produced at block 408 by taking each expression from the rgTemp array such that the evaluation of the expression by the Generate partition function (GeneratePartitionFn( )) of rgTemp[i] returns the value [i]. Processing then terminates at block 410.

Figure 4A:
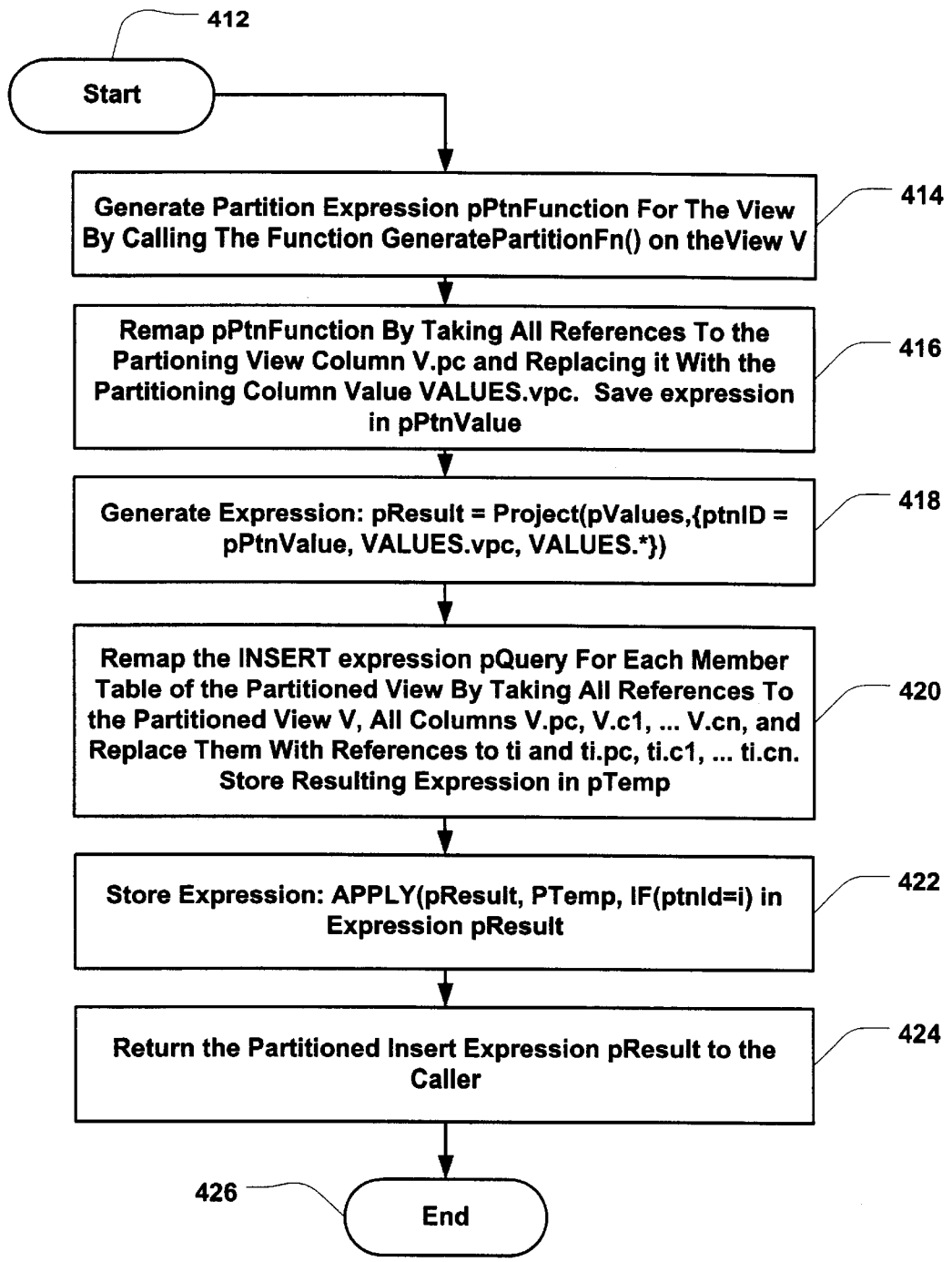
FIG. 4A is a flow diagram showing the processing performed to execute INSERT statements in accordance with the present invention.

FIG. 4A shows the processing performed to realize INSERT statements for offered queries. For an INSERT query pInsert, inserting into a partitioned view V(pc, c1, . . . ), values VALUES (vpc,v1, . . . vn), it is presumed that the view V is partitioned by column V.pc over tables T1(pc,c1, . . . ), . . . Tn(pc, c1, . . . ). As such the format of offered INSERT queries may take the form of: pInsert (pValues). When processing INSERT queries, processing begins at block 412 and proceeds to block 414 where the partition expression pPtnFunction is generated for view V by calling the function GeneratePartitionFn( ) (as described by FIG. 4) on the view V. From there processing proceeds to block 416 where the expression pPtnFunction is remapped by taking all of the references to the partitioning view column V.pc and replacing it with partitioning column value vpc. The resultant expression is saved as pPtnValue. Once pPtnValue is created and saved, processing proceeds to block 418 where the following expression is generated:

pResult=Project (pValues, {ptnID=pPtnValue, VALUES.vpc, VALUES.*})

In the expression, the Project function is called to map view characteristics onto the member tables. The original INSERT expression pQuery is remapped at block 420 for each member table Ti by taking all references to the partitioned view V, all columns V.pc, V.c1, . . . V.cn and replacing them with references to Ti and Ti.pc, Ti.c, . . . Ti.cn. The resulting expression is store in pTemp. From there the expression APPLY(pResult, Ptemp, IF(ptnId=I) is executed and stored in the expression pResult at block 422. In operation, the APPLY operation has an outer child that produces a stream of rows and an inner child that has references to values produced by the outer. That is, for every outer row the references in the inner child are bound to the appropriate values and the inner child is executed. The APPLY operation is described in more detail in co-pending U.S. Patent, Ser. No. 09/212558 entitled, "A Method to Evaluate SQL Sub-queries" now U.S. Pat. No. 6,411,951 which is herein incorporated by reference in its entirety. The expression pResult is then returned to the caller at block 424 and processing proceeds to terminate for the pinsert query at block 426.

Figure 4B:
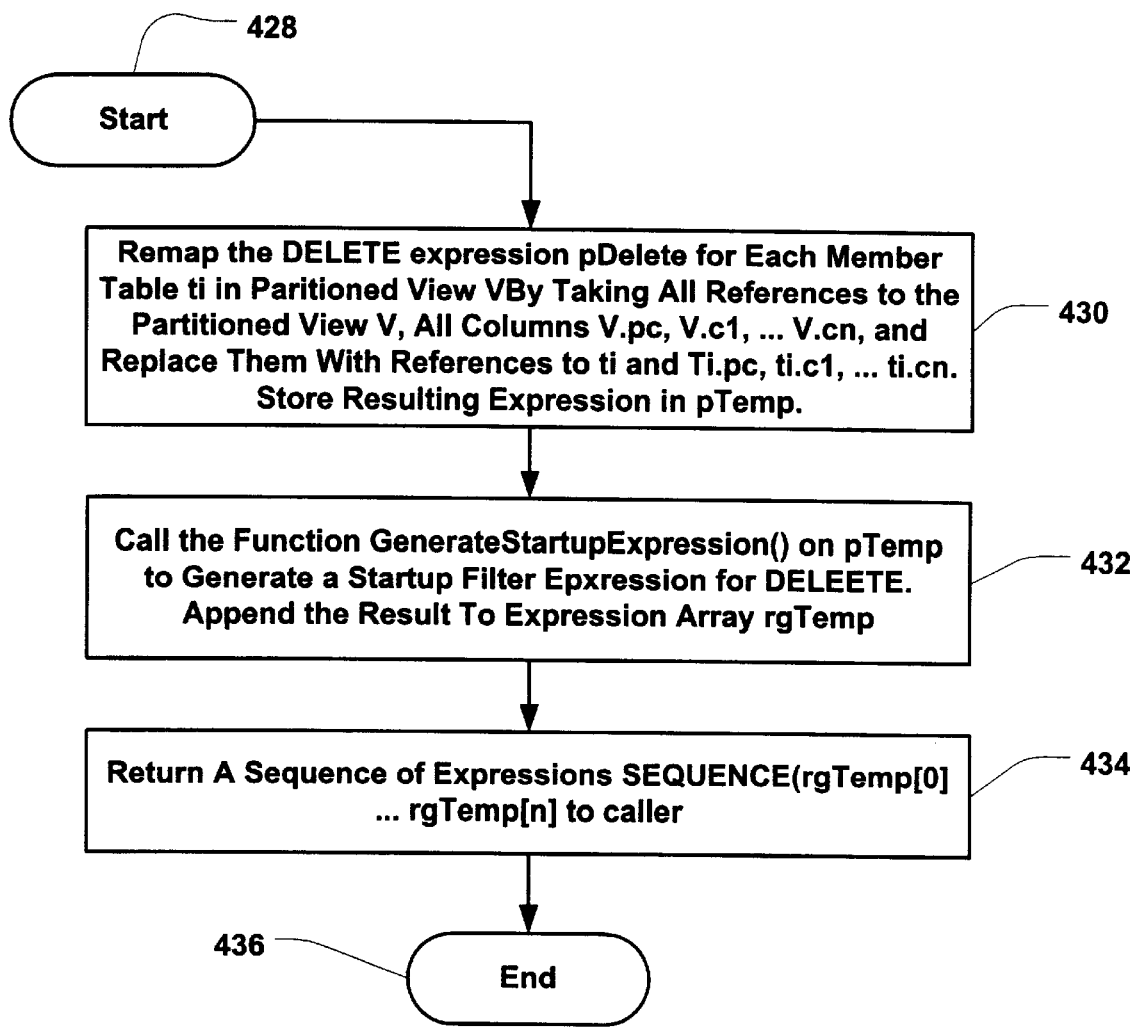
FIG. 4B is a flow diagram showing the processing performed to execute DELETE statements in accordance with the present invention.

FIG. 4B shows the processing performed to execute the DELETE query pDelete on partitioned view V(pc,c1, . . . ) over tables T1(pc, c1, . . . ). . . Tn(pc,c1,. . . ). Processing begins at block 428 and proceeds to block where the DELETE expression pDelete is remapped for each member table by taking all references to the partitioned view V, all columns V.pc, V.c1, . . . V.cn and replacing them with references to Ti and Ti.pc, Tti.c1, . . . Tti.cn. The resultant data is stored in the expression pResult. From there processing proceeds to block 432 where the function Generate StartupExpression( ) is called for execution on the expression pTemp to generate a start-up filter expression for the DELETE statement. The resultant data is stored in the expression pTempStartup. The notion of start-up filters is described in more detail in co-pending and pending U.S. patent application, Ser. No. 09/839,807, entitled "Creation and Execution of Efficient Scalar-Based Queries in Database Environments", which is herein incorporated by reference in its entirety. Once the start-up filter expression is generated, the filter is stored in the array rgTemp in location rgTemp[i]. These expressions are returned to the caller at block 434 in the form SEQUENCE(rgTemp[0] . . . rgTemp[n−1]). In operation the SEQUENCE function is a relational operator which consumes tuples from all n−1 inputs and then returns tuples from the nth input to the consumer. Processing then terminates at block 436.

Figure 4C:
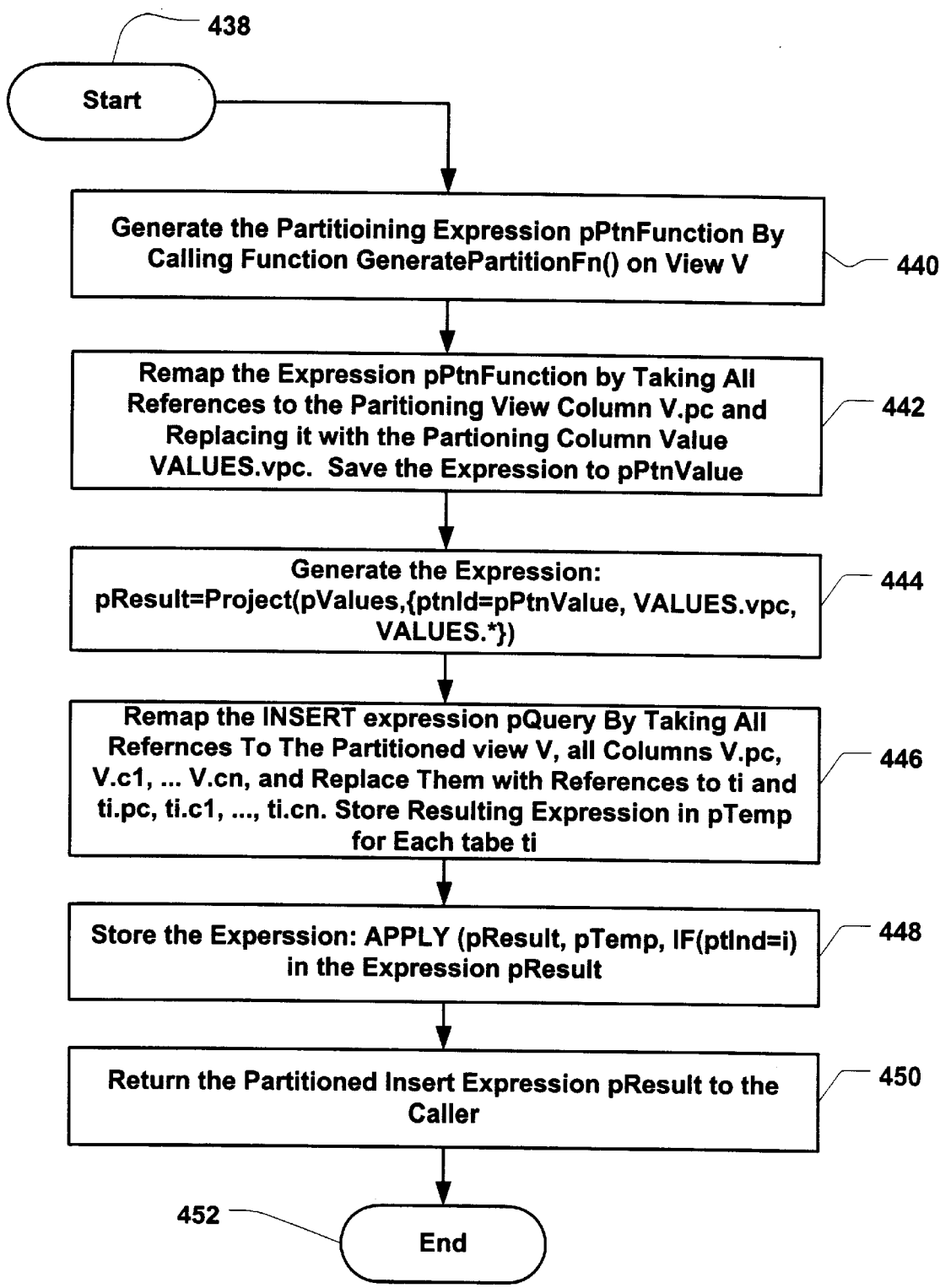
FIG. 4C is a flow diagram showing the processing performed to execute partitioned column UPDATES in accordance with the present invention.

FIG. 4C shows the processing performed to execute an UPDATE query pUpdate, updating a partitioned view V(pc, c1, . . . ), with values VALUES(vpc, v1, . . . vn) having partitioned column updates. The view V is partitioned by column V.pc over tables T1(pc,c1, . . . ), . . . Tn(pc, c1, . . . ). The format of the input query may take the form of pUpdate(pValues). As shown, processing begins at block 438 and proceeds to block 440 where the partitioning expression pPtnFunction is generated by calling function GeneratePartitionFn( ) on View V. From there processing proceeds to block 442 where the expression pPtnFunction is remapped by taking all references to the partitioning view column V.pc and replacing it with the partitioning column value VALUES.vpc. The resultant expression is stored in the variable pPtnValue. Using the expression pPtnValue, the expression pResult=Project(pValues, {ptnId=pPtnValue, VALUES.vpc, VAL-UES.*})

is generated at block 446. The Project function allows data to have new relations. In this context, the partition value definitions are mapped to view value definitions. Processing then proceeds to block 446 where the INSERT expression is remapped for each member table ti by taking all references to the partitioned view V, all columns Vpc, V.c1, . . . V.cn, and replace them with references to ti and ti.pc, ti. c1, . . . , ti.cn. The results are stored in the expression pTemp. The expression pTemp is then used to execute and generate the function APPLY(pResult, pTemp, IF(ptnId=i)) that is stored in the expression pResult at block 448. The resultant pResult is returned to the called at block 450. Processing then terminates at block 452.

Figure 4D:
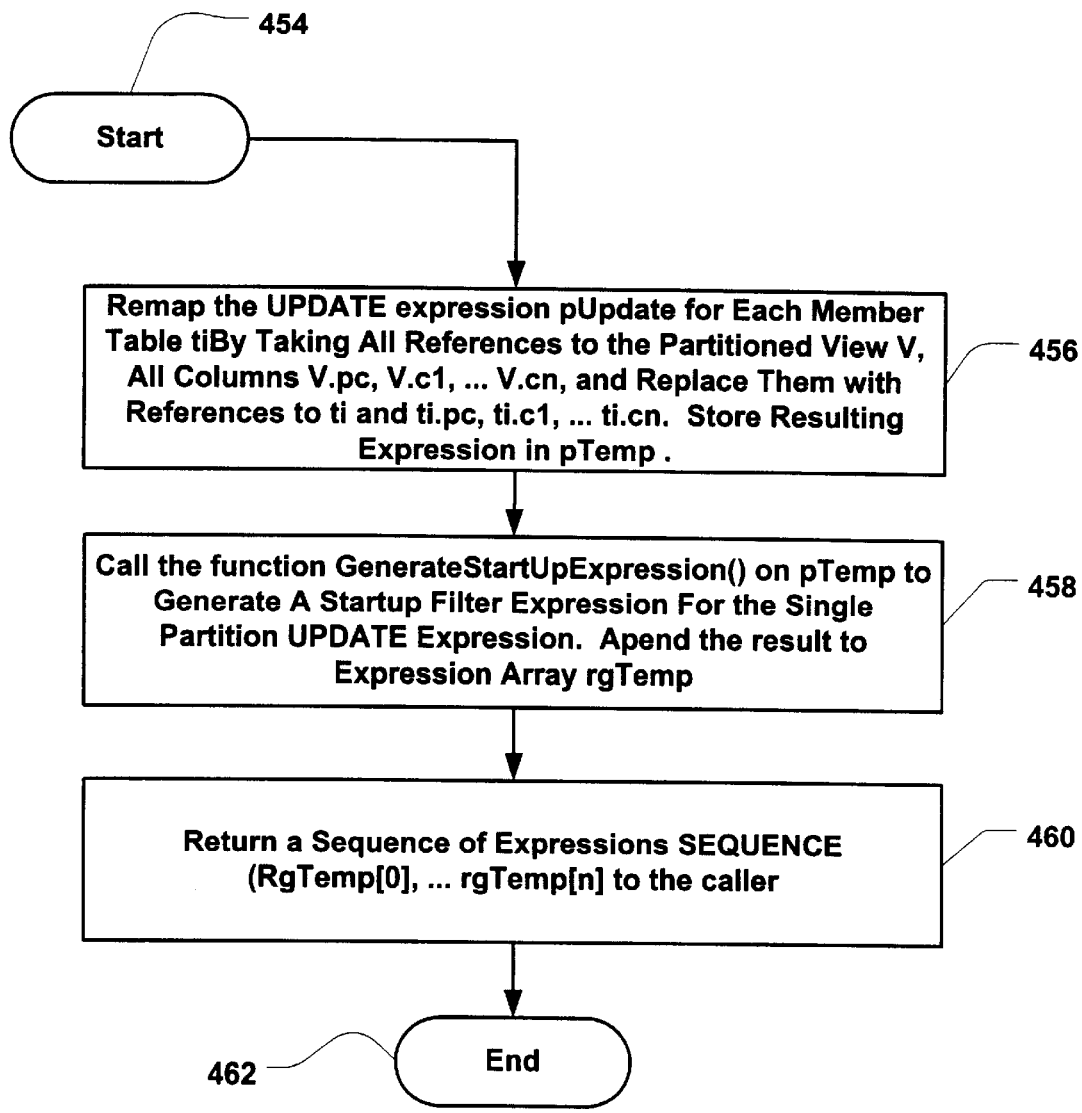
FIG. 4D is a flow diagram showing the processing performed to execute non-partitioned column UPDATES in accordance with the present invention.

FIG. 4D shows the processing performed for an UPDATE query pUpdate, updating the non-partitioned columns of the of the partitioned view V(c1, . . . ) with values VALUES(v1, . . . vn). The input may take the format of pUpdate(pValues). As shown, processing begins at block 454 and proceeds to block 456 where the expression pUpdate is remapped for all member tables ti by taking all references to the partitioned view V, and all columns .Vpc, V.c1, . . . V.cn and replacing them with references to Ti and Ti.pc, Ti.c1, . . . Ti.cn. The resulting expression is stored in pTemp. From there processing proceeds to block 458, where the function GenerateStartUpExpression( ) is called to operate on the pTemp expression to generate a start-up filter expression pTempStartup for the Single Partition UPDATE expression. The notion of start-up filters is described by co-pending, and pending U.S. patent application Ser. No. 09/839807, entitled "Creation and Execution of Efficient Scalar-Based Queries in Database Environments", which is herein incorporated by reference in its entirety. The start-up filter expression is appended to the array rgTemp. The rgTemp array is then processed at block 460 to return a sequence of expressions SEQUENCE (rgTemp[0] . . . rgTemp[n−1]) to the caller (e.g. issuing node providing the query).

Figure 5:
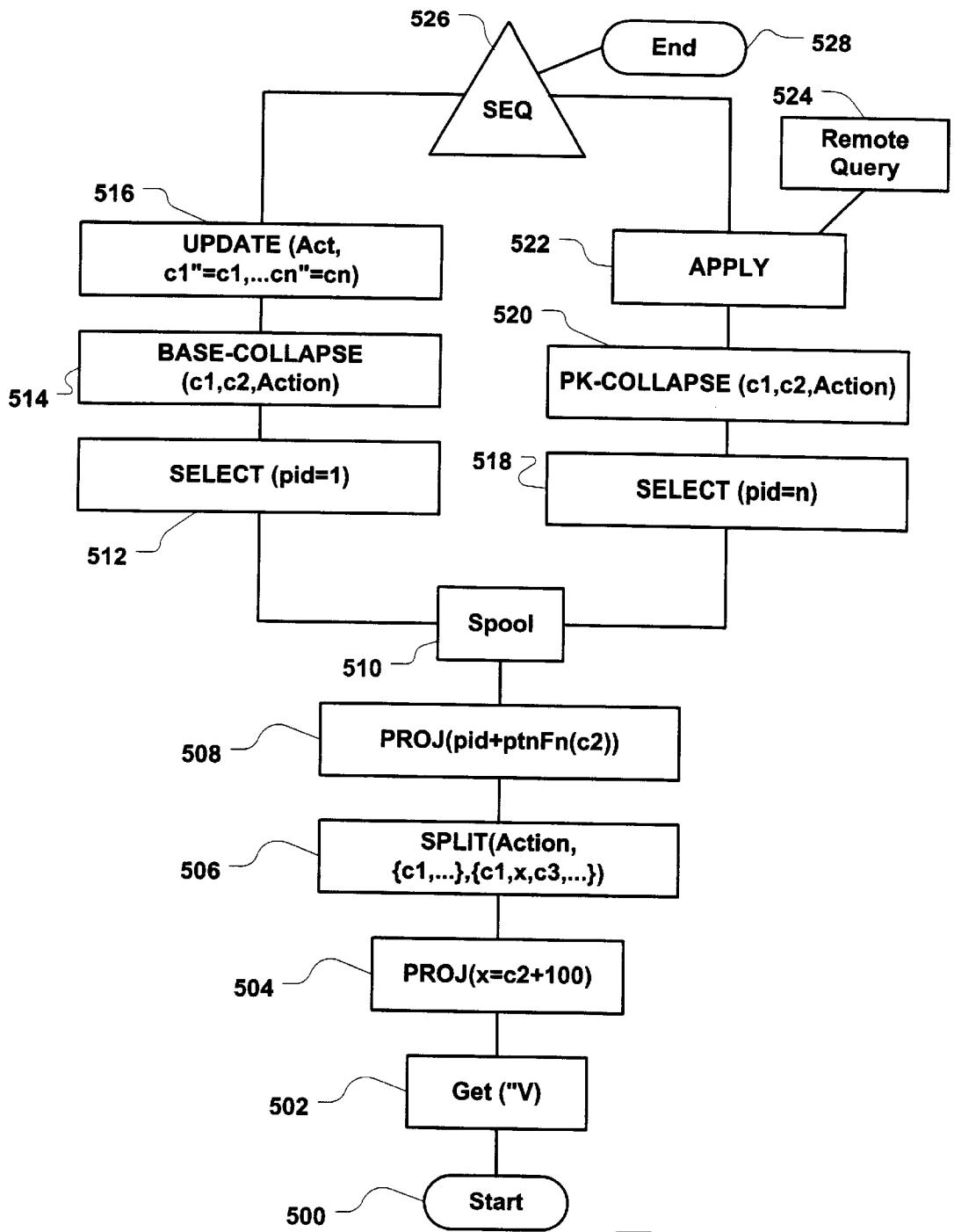
FIG. 5 is a flow diagram showing the processing performed to execute partitioned column updates on multiple partitioning columns in accordance with the present invention.

FIG. 5 shows a flowchart of the processing performed to execute an UPDATE on multiple partitioning columns. For example the distributed partitioned view is defined as:
CREATE TABLE 1 (c1 INT, C2 INT NOT NULL CHECK (c2 BETWEEN 1 AND 10)
. . . , PRIMARY KEY (c1,c2))
CREATE TABLE Tn (c1 int, C2 INT NOT NULL CHECK (c2 BETWEEN 91 and 100),
. . . , PRIMARY KEY (c1, c2))
CREATE VIEW V AS
SELECT * FROM node1.db.dbo.T1 UNION ALL
SELECT * FROM nodeN.db.dbo.Tn
Given an update to the partitioning column (e.g.UPDATE V SET c2=c2+100), a query execution plan can be formulated and executed as shown in FIG. 5 may be executed. As shown, processing begins at block 500 and proceeds to block 502 where a snapshot of the partitioned view V is taken by executing the function GET("V") to return the view definition. From there processing proceeds to block 502 where a projection of the view (e.g. PROJ(x=c2+100) is performed with the new update query. A SPLIT action is then performed at block 504 to interlace the updated columns with existing columns. The SPLIT operator takes an input tuple containing all "old" column values for a table and all "new" column values for a table and pivots the result producing a single column attribute for each old/new column pairing and an additional "action" column whose value describes if the tuple is an "old" DELETED value or "new" INSERTED value for the row. Another projection is performed (e.g. PROJ(pid=ptnFn(c2)) at block 508 to generate a table having the new update correlated with appropriate partition ids. From there the projection is spooled at block 510. Processing then diverges depending on which partition is being updated. For the first partition (i.e. pid=1), a SELECT command is performed to select members tables of the first partition. A COLLAPSE is then performed at block 514 on the first partition such that the columns are prepared for the appropriate update. The COLLAPSE operator takes an INSERT and DELETE operation applied to a single PRIMARY KEY value and collapses these two tuples into a single UPDATE operation, preserving the INSERT tuple values. The update function is then performed at block 516 such that the second column (c2) is incremented by a value of 100 (as stated in the provided example) for the first partition. Processing then proceeds to block 526.

Alternatively, if the update is being performed for partitions that are not the first partition, processing proceeds from block 510 to block 518 where tables of the non-first partition are read using the SELECT operation. From there a COLLAPSE is performed at block 520 to prepare the columns for update. An APPLY operation is performed at block 522 to incorporate the offered query. The APPLY operation also facilitates the updating of remote tables through remote query operation 524. Remote tables are updated similarly to local tables by composing a remote query string which is parameterized using the split action column. If the change row is an INSERT row, the remote query processes a tuple INSERT into the remote partition. If the change row is a DELETE row, the remote query processes a single tuple DELETE on the remote partition by locating the row using the PRIMARY KEY column values. If the change row is an UPDATE row, the remote query processes a single tuple UPDATE on the remote partition by locating the row using the PRIMARY KEY column values. From block 524, processing proceeds to block 526 where the data from 516 and from block 524 is sequenced using the above-described SEQUENCE operation. Processing then terminates at block 528.

In sum, the present invention contemplates a system and methods providing transparent updates of views in database environments. In an illustrative implementation, the inventive concepts described herein are realized through one or more instances of MICROSOFT® SQL Server 2000™ operating to process data. It is understood, however, that the invention is susceptible to various modifications and alternative constructions. There is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of computer systems. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner. Further, the storage elements of the exemplary computing applications may be relational or sequential (flat file) type computing databases that are capable of storing data in various combinations and configurations.

Although exemplary embodiments of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention construed in breadth and scope in accordance with the appended claims.

What is claimed is:

1. A method to update distributed partitioned views in distributed database environments comprising the steps of:
   generating a partitioning function, said partitioning function providing a mapping of data from table definitions to view definitions; and
   applying said partitioning function to carry out a request to modify data in said distributed partitioned views, by modifying the contents of tables used by those distributed partitioned views.

2. The method recited in claim 1, wherein said generating step comprises the step of loading partitioning constraint expressions on partitioning columns, for each child table of said distributed partitioned views.

3. The method recited in claim 2, wherein said loading step further comprises the steps of:
   remapping the partitioning constraint expressions to produce a partition check expression (pExprPtnCheck), wherein said remapping step comprises replacing all occurrences of partition column table definitions with partition column view definition; and
   storing said partition check expression (pExprPtnCheck) into a lookup structure, such as an expression array rgTemp, wherein said location rgTemp [i] stores information for child table "i".

4. The method recited in claim 3, wherein said generating step comprises the step of producing a partitioning expression (pEprPtnFn), said partitioning expression operates on a data row and returns the value "i", whereinsaid constraint rgTemp[i] holds said value "i" for said data row.

5. The method recited in claim 1, wherein said applying step comprises the step of performing an INSERT in said distributed partitioned views.

6. The method recited in claim 5, wherein said performing step comprises the steps of:
   generating a partitioning expression (pPtnFunction) for execution as part of an execution plan on distributed partitioned views by calling said partitioning function for offered INSERT query statements;
   remapping said partitioning expression (pPtnFunction), wherein said remapping of said partitioning expression (pPtnFunction) comprises the step of replacing partitioning view column (V.pc) definitions with partitioning column values (VALUES.vpc); and
   storing said expression into a INSERT partitioning variable (pPtnValue);
   generating a result expression (pResult), said result expression being representative of the values to be inserted in said distributed partitioned views;
   remapping said offered INSERT query statements for each table in said distributed partitioned views, said remapping step comprising the steps of replacing all column references in the partitioned view with table references and storing the resultant query plan in a temporary INSERT partitioned variable (pTemp);
   performing an APPLY function on said result expression (pResult) and said temporary INSERT partitioned variable (pTemp) such that the result is stored in said result expression (pResult); and
   returning said result expression pResult.

7. The method recited in claim 6 further comprising the steps of executing steps provided by said result expression pResult to modify said tables with in accordance with said offered INSERT query statements.

8. The method recited in claim 1, wherein said applying step comprises the step of performing a DELETE in said distributed partitioned views.

9. The method recited in claim 8, wherein performing step comprises the steps of:
   remapping offered DELETE expressions, said remapping step comprising the steps of replacing references to said distributed partitioned view columns with references to table columns to produce a resultant set, and storing said resultant set in a DELETE partitioning variable (pTemp); and
   generating start-up filters for said DELETE partitioning variable to produce expression array rgTemp having relevant delete expressions, said start-up filters removing redundant partitions when processing said offered DELETE expressions.

10. The method recited in claim 8 further comprising the step of returning a sequence of expressions, said sequence of expressions created by executing the SEQUENCE operation.

11. The method recited in claim 8 further comprising the step of executing steps provided in said expression array rgTemp to modify said tables in accordance with said offered DELETE expressions.

12. The method recited in claim 1, wherein said applying step comprises the step of performing a UPDATE on partitioned columns in said distributed partitioned views.

13. The method recited in claim 12, wherein said performing step comprises the steps of:
   generating a partitioning expression (pPtnFunction) for execution as part of an execution plan on distributed partitioned views by calling said partitioning function for offered UPDATE query statements;

remapping said partitioning expression (pPtnFunction) by taking all references to the partitioning view column and replacing said partitioning view column references with partitioning column values to produce a resultant remapped partitioning expression (pPtnValue);

generating a result expression (pResult) using the remapped partitioning expression (pPtnValue);

remapping offered UPDATE expressions for each table in said distributed partitioned views, said remapping step comprising the steps of replacing all references to the partitioned view columns with table columns to produce a UPDATE resultant expression (pTemp), and storing said UPDATE resultant expression;

executing an APPLY operation on said UPDATE resultant expression, to produce the UPDATE expression pResult; and returning said UPDATE expression pResult.

14. The method recited in claim 13 further comprising the steps of executing steps provided by said UPDATE expression pResult to modify said tables with in accordance with said offered UPDATE query statements.

15. The method recited in claim 12, wherein said performing step comprises the step of:
getting the appropriate distributed partitioned view, to produce processing view V;
applying a projection of said view V such that a substitution is made for data entries, said substitution representative of desired update;
executing a SPLIT operation to segregate dissimilar elements into differing expressions;
applying a projection to said partitioned column, said projection representative of a mapping of partitioning column elements; and
performing a spooling of said projection to said partitioned column.

16. The method recited in claim 15, further comprising the steps of:
selecting the first partition of said distributed partitioned views;
performing a COLLAPSE on said first partition; and
performing an UPDATE to produce a resultant expression pResult1.

17. The method recited in claim 15, further comprising the steps of:
selecting the non-first partition of said distributed partitioned views;
performing a COLLAPSE on said non-first partition; and
executing an apply to the resultant of said COLLAPSE to produce a resultant expression pResult2.

18. The method recited in claim 16 or 17 further comprising the step of performing a SEQUENCE on said pResultl and said pResult2.

19. The method recited in claim 1, wherein said applying step comprises the step of performing an UPDATE on non-partitioned columns in said distributed partitioned views.

20. The method recited in claim 12, wherein said performing step comprises the steps of:
remapping offered UPDATE expressions, said remapping step comprising the steps of replacing all references to the partitioned view columns with table column references to produce a non-partitioned UPDATE expression pResult, and storing said pResult; and
generating start-up filters for said non-partitioned UPDATE expression to produce expression array rgTemp having relevant update of non-partitioned column expressions, said start-up filters removing redundant partitions when processing said offered UPDATE of non-partitioned expressions.

21. The method recited in claim 20 further comprising the step of executing steps provided in said expression array rgTemp to modify said tables in accordance with said offered UPDATE expressions.

22. A computer readable storage medium comprising computer-executable instructions for instructing a computer to perform the acts recited in claim 1.

23. A system providing transparent updates of views in database environments comprising:
a partitioning function generation system; and
an application system, said application cooperating with said partitioning function generation system to execute said transparent updates in said database environments.

24. The system recited in claim 23 wherein said partitioning function generation system produces a partitioning constraint expression, wherein said partitioning constraint expression is re-mapped to replace occurrences of table definitions with view definitions and is used to evaluate re-mapped expressions.

25. The system recited in claim 23, wherein said application system performs various operations on said views, said operations comprising any of: INSERT, UPDATE on non-partitioned columns, UPDATE on partitioned columns, and DELETE.

26. The system recited in claim 24, wherein said application system employs said partitioning function generation system to generate a partitioning function when performing said operations on said views, said operations comprising any of said INSERT, UPDATE on non-partitioned columns, and UPDATE on partitioned columns, and DELETE.

27. A method providing updates of views in database environments comprising:
generating a partitioning function, said partitioning function mapping table definitions of said views to view definitions; and
applying said generating function to said views, said applying step comprising the step of performing operations on said views, said operations comprising any of: INSERT, UPDATE on partitioned columns, UPDATE on non-partitioned columns, and DELETE.

* * * * *